United States Patent [19]

Argoudelis et al.

[11] 4,091,201

[45] May 23, 1978

[54] PROCESS FOR RECOVERING ANTIBIOTICS U-50,147 AND U-51,738

[75] Inventors: Alexander D. Argoudelis, Portage; LeRoy E. Johnson, Kalamazoo, both of Mich.

[73] Assignee: The Upjohn Company, Kalamazoo, Mich.

[21] Appl. No.: 775,857

[22] Filed: Mar. 9, 1977

Related U.S. Application Data

[62] Division of Ser. No. 684,014, May 7, 1976, Pat. No. 4,029,548.

[51] Int. Cl.$^2$ ............................................. C07H 15/22
[52] U.S. Cl. ...................................536/17; 195/80 R; 260/514 J; 424/181
[58] Field of Search ....................... 536/17; 260/468 J

[56] References Cited

U.S. PATENT DOCUMENTS

4,029,548   6/1977   Argoudelis et al. ................... 536/17

OTHER PUBLICATIONS

Snow et al. "Jour. of Organic Chem.," vol. 33, No. 5, May, 1968, pp. 1774–1778.
Shoji, "The Jour. of Antibiotics," vol. XXIII, No. 6, Jun., 1970, pp. 291–294.
Shoji, "The Jour. of Antibiotics," vol. XXIII, No. 11, Nov., 1970, pp. 569–571.

*Primary Examiner*—Johnnie R. Brown
*Attorney, Agent, or Firm*—Roman Saliwanchik

[57] ABSTRACT

Microbiological process for preparing the known antibiotics, antibiotic A-396-1 and L-dihydrophenylalanine, by use of the new microorganism *Streptomyces lemensis*, NRRL 8170 using controlled fermentation conditions. These antibiotics are active against Gram-positive and Gram-negative bacteria. Accordingly, they can be used in various environments to eradicate or control such bacteria.

8 Claims, No Drawings

PROCESS FOR RECOVERING ANTIBIOTICS U-50,147 AND U-51,738

This is a division of application Ser. No. 684,014, filed May 7, 1976, now U.S. Pat. No. 4,019,548.

BACKGROUND OF THE INVENTION

Antibiotic A-396-1 is a known antibiotic described in The Journal of Antibiotics, Vol. 23, No. 6, pages 291-294 (1970) and The Journal of Antibiotics, Vol. 23, No. 11, pages 569-571 (1970). Antibiotic L-dihydrophenylalanine is a known antibiotic described in J. Org. Chem., 33, 1777 (1968).

BRIEF SUMMARY OF THE INVENTION

The novel process of the invention consists of using the new microorganism Streptomyces lemensis, NRRL 8170, and employing controlled fermentation conditions, to produce the known antibiotic A-396-1, hereinafter referred to as U-50,147, and L-dihydrophenylalanine, hereinafter referred to as U-51,738.

The antibiotics produced by the subject process have the property of adversely affecting the growth of Grampositive bacteria, for example, Staphylococcus aureus and Bacillus subtilis, and Gram-negative bacteria, for example, Escherichia coli and Klebsiella pneumoniae. Accordingly, these antibiotics can be used to disinfect washed and stacked food utensils contaminated with S. aureus; they also can be used as disinfectants on various dental and medical equipment contaminated with S. aureus. Further, these antibiotics can be used for suppressing the growth of sensitive organisms in plate assays and other biological media.

DETAILED DESCRIPTION OF THE INVENTION

The microorganism used for the production of antibiotics U-50,147 and U-51,738 is streptomyces lemensis, NRRL 8170.

A subculture of this microorganism can be obtained from the permanent collection of the Northern Regional Research Laboratory, U.S. Department of Agriculture, Peoria, Illinois, U.S.A. Its accession number in this depository is NRRL 8170. It should be understood that the availability of the culture does not constitute a license to practice the subject invention in derogation of patent rights granted with the subject instrument by governmental action.

The microorganism of this invention was studied and characterized by Alma Dietz of the Upjohn Research Laboratories.

A streptomycete isolated from a soil sample has been studied and found to differ in macroscopic, microscopic and bichemical properties from members of the Genus Streptomyces characterized in Bergey's Manual of Determinative Bacteriology [Buchanan, R. E., and N. E. Gibbons. 1974. Bergey's Manual of Determinative Bacteriology, Eight Edition, The Williams and Wilkins Co., Baltimore], from cultures characterized in Shirling and Gottlieb [Shirling, E. B., and D. Gottlieb. 1968. Cooperative description of type cultures of Streptomyces. II. Species descriptions from first study. 18:68-189] [Shirling, E. B., and D. Gottlieb. 1968. Cooperative description of type cultures of Streptomyces. III. Additional species descriptions from first and second studies. Int. J. Syst. Bacteriol. 18:280-399] [Shirling, E. B., and D. Gottlieb. 1969. Cooperative description of type cultures of Streptomyces. IV. Species descriptions from the second, third and fourth studies. Int. J. Syst. Bacteriol. 19:391-512] [Shirling, E. B., and D. Gottlieb. 1972. Cooperative description of type strains of Streptomyces. V. Additional descriptions. Int. J. Syst. Bacteriol. 22:285-394], and from "type" cultures in the Upjohn Culture Collection.

S. lemensis could be placed in a Gray or Red series of melanin-negative cultures with smooth spores in spiral spore chains. The new culture is readily distinguished from the cultures in the references cited by its color pattern, its utilization of carbon compounds in synthetic media [Pridham, T. G., and D. Gottlieb. 1948. The utilization of carbon compounds by some Actinomycetales as an aid for species determination. J. Bacteriol. 56:107-114] [Shirling, E. B., and D. Gottlieb. 1966. Methods for characterization of Streptomyces species. Int. J. Syst. Bacteriol. 16:313-340], and its production of the antibiotics N-demethylhygromycin B and dihydrophenylalanine.

N-demethylhygromycin B (A-396-1) is produced by Streptoverticillium eurocidicus, Junichi Shoji, et al. 1970. Isolation of a new water-soluble basic antibiotic A-396-1, J. Antibiotics 23, 291-294; and Tamura, Atsushi, Ryuje Furuta and Hirotada Kotami. 1975. Antibiotic A-16316-C, a new water-soluble basic antibiotic. The Journal of Antibiotics XXVIII: 260-265. The verticillate spore chains of S. eurocidicus make additional comparisons with S. lemensis unnecessary.

Production of dihydrophenylalanine by an actinomycete has not been reported in the literature.

The distinctive properties cited for the culture characterized require it to be considered a new species of Streptomyces designated Streptomyces lemensis sp.n. This is to be considered the type species. Should variants be designated, the type species will become the type subspecies (Streptomyces lemensis sub.sp. lemensis). The culture is designated a new species in accordance with the rules of nomenclature set forth in the International Code of Nomenclature of Bacteria [Lapage, S. P., P. H. A. Sneath, E. F. Lessel, V. B. D. Sherman, H. P. R. Seeliger and W. A. Clark. 1975. International Code of Nomenclature of Bacteria. Amer. Soc. for Microbiology, Washington, D.C.].

*Streptomyces lemensis* Dietz sp.n.

Color characteristics.

Aerial growth lavender-gray-tan or grayish reddish brown. Melanin-negative. Appearance on Ektachrome is given in Table 1. Reference color characteristics are given in Table 2. The culture may be placed in the Red (R) or Gray (GY) color groups of Tresner and Backus [Tresner, H. D., and E. J. Backus. 1963. System of color wheels for streptomycete taxonomy. Appl. Microbiol. 11:335-338].

Microscopic characteristics.

Smooth spores with convolutions are found in spiral spore chains. The chains contain more then 10 appressed spores. Microscopic determinations followed the procedure of Pridham et al. [Pridham, T. G., C. W. Hesseltine, and R. G. Benedict. 1958. A guide for the classification of streptomycetes according to selected groups. Placement of strains in morphological sections. Appl. Microbiol. 6:52-79] and Dietz and Mathews [Dietz, A., and J. Mathews. 1971. Classification of Streptomyces spore surfaces into five groups. Appl. Microbiol. 21:527-533].

Cultural and biochemical characteristics.

Cultural and biochemical characteristics are cited in Table 3.

Carbon utilization.

Carbon utilization was determined following the procedures of Pridham and Gottlieb, supra, J. Bacteriol. 56:107–114, and Shirling and Gottlieb, supra, Int. J. Syst. Bacteriol. 16:313–340. In the former the culture grew well on the basal medium (no carbon compound added) and D-xylose, L-arabinose, D-fructose, D-galactose, D-glucose, D-mannose, maltose, sucrose, lactose, cellobiose, raffinose, dextrin, soluble starch, glycerol, D-mannitol, sodium acetate, sodium citrate, and sodium succinate; moderately on rhamnose, inulin, dulcitol, D-sorbitol, inositol, and sodium tartrate; and poorly on sodium oxalate. There was no growth on salicin, phenol, cresol, sodium formate, or sodium salicylate. In the latter growth was strong on the positive control (basal medium plus D-glucose), D-xylose, D-mannitol, and D-fructose; positive on the negative control (basal medium without carbon compound), L-arabinose, sucrose, rhamnose, and raffinose; and negative on inositol and cellulose.

Temperature.

The culture had good vegetative and aerial growth at 18° to 37° C. There was smooth vegetative growth after 24 hours at 45° C. The culture did not grow at 55° C. The media used for temperature studies were Bennett's, Czapek's sucrose, maltose-tryptone, and Hickey-Tresner agars.

TABLE 1

Appearance of *Streptomyces lemensis* on Ektachrome*

| Agar Medium | Surface | Reverse |
|---|---|---|
| Bennett's | Lavender-gray-red | Gray-red-tan |
| Czapek's sucrose | Trace lavender-gray | Trace gray-yellow |
| Maltose-tryptone | Lavender-gray-red | Red-tan |
| Peptone-iron | — | Yellow |
| 0.1% Tyrosine | Trace lavender-gray | Pale Yellow |
| Casein-starch | Lavender-gray | Pale lavender-gray |

*Dietz, A. 1954. Ektachrome transparencies as aids in actinomycete classification. Ann. N.Y. Acad, Sci. 60:152–154.

Table 2

Reference Color Characteristics of *Streptomyces lemensis*

| Agar Medium | Determination | Chip No. | ISCC-NBS Color-Name Charts illustrated with Centroid Colors* | |
|---|---|---|---|---|
| | | | Color | |
| Bennett's | S | 45 | l.gy. r Br | Light Grayish Reddish Brown |
| | R | 75 | deep y Br | Deep Yellowish Brown |
| | | 73 | d. y. Br | Dark Yellowish Brown |
| | P | 79 | l.gy. yBr | Light Grayish Yellowish Brown |
| Czapek's | S | 73 | p. OY | Pale Orange Yellow |
| sucrose | R | 73 | p. OY | Pale Orange Yellow |
| | P | — | — | — |
| Maltose- | S | 45 | l.gy. r Br | Light Grayish Reddish Brown |
| tryptone | R | 76 | ly.y Br | Light Yellowish Brown |
| | P | 79 | l. gy. y Br | Light Grayish Yellowish Brown |
| Hickey- | S | 45 | l.gy. r Br | Light Grayish Reddish Brown |
| Tresner | R | 68 | s. OY | Strong Orange Yello |
| | P | 79 | l.gy. y Br | Light Grayish Yellowish Brown |
| Yeast extract- | S | 45 | l.gy. r Br | Light Grayish Reddish Brown |
| malt extract | R | 17 | m. OY | Moderate Orange Yellow |
| (ISP-2) | P | 79 | l.gy. y Br | Light Grayish Yellowish Brown |
| Oatmeal | S | 45 | l.gy. r BR | Light Grayish Reddish Brown |
| (ISP-3) | R | 67 | brill. OY | Brilliant Orange-Yellow |
| | P | — | — | — |
| Inorganic- | S | 45 | l.gy. r Br | Light Grayish Reddish Brown |
| salts-starch | R | 74 | s. y Br | Strong Yellowish Brown |
| (ISP-4) | P | 72 | d. OY | Dark Orange Yellow |
| Glycerol- | S | 60 | l.gy. Br | Light Grayish Reddish Brown |
| asparagine | R | 71 | ml OY | Moderate Orange Yellow |
| (ISP-5) | | 67 | brill. OY | Brilliant Orange Yellow |
| | P | 79 | l.gy. y Br | Light Grayish Yellowish Brown |

S = Surface
R = Reverse
P = Pigment
*Kelly, K.L., and D.B. Judd. 1955. The ISCC-NBS method of designating colors and a dictionary of color names. U.S. Dept. of Comm. Circ. 553, Washington, D.C.

Table 3

Cultural and Biochemical Characteristics of *Streptomyces lemensis*

| Medium | Surface | Reverse | Other Characteristics |
|---|---|---|---|
| Agar | | | |
| Peptone-iron | — | Pale colorless or cream | No pigment Melanin negative |
| Calcium malate | — | Colorless | No pigment Malate not solubilized |
| Glucose asparagine | Lavender-gray-cream | Orange-tan | Pale orange-tan pigment |
| Skim milk | Trace gray-white | Pale orange-tan | Pale orange-tan pigment Casein solubilized under growth to around growth |
| Tyrosine | Pale gray-pink | Pale cream | Pale cream pigment Tyrosine not solubilized |
| Xanthine | Trace gray-pink | Very pale cream | Pale cream pigment Xanthine solubilized |
| Nutrient starch | Pale gray-pink | Pale cream | No pigment Starch partially solubilized |
| Yeast extract- | Good lavender-gray | Red-tan with | Pink-tan pigment |

Table 3-continued

| Medium | Surface | Reverse | Other Characteristics |
|---|---|---|---|
| malt extract | | pale tan edge | |
| Peptone-yeast extract-iron (ISP-6) | — | Pale yellow-tan | Pale yellow-tan pigment |
| Tryosine (ISP-7) | Good lavender-gray | Pale red-tan | Pale red-tan pigment |
| Gelatin | | | |
| Plain | — | — | Liquefaction - ¼ |
| Nutrient | — | — | Liquefaction - ¼ to complete |
| Broth | | | |
| synthetic nitrate | Colorless flaky surface pellicle | — | No pigment<br>Trace growth throughout<br>Flocculent bottom growth<br>Nitrate reduced to nitrite |
| Nutrient nitrate | Colorless surface pellicle | — | Flocculent bottom growth<br>Nitrites not found |
| Litmus milk | Gray aerial growth or surface ring | Blue-gray | Peptonization - ⅜<br>Coagulation - ⅛<br>Decolorization - ⅜<br>pH 6.73–7.55 |

The compounds of the invention process are produced when the elaborating organism is grown in an aqueous nutrient medium under submerged aerobic conditions. It is to be understood, also, that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include cornsteep liquor, yeast, autolyzed brewer's yeast with milk solids, soybean meal, cottonseed meal, cornmeal, milk solids, pancreatic digest of casein, fish meal, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as components of the medium prior to sterilization of the medium.

Production of the compounds by the invention process can be effected at any temperature conducive to satisfactory growth of the microorganism, for example, between about 18° and 40° C., and preferably between about 20° and 28° C. Ordinarily, optimum production of the compound is obtained in about 3 to 15 days. The medium normally remains acidic during the fermentation. The final pH is dependent, in part, on the buffers present, if any, and in part on the initial pH of the culture medium.

When growth is carried out in large vessels and tanks, it is preferably to use the vegetative form, rather than the spore form, of the microorganism for inoculation to avoid a pronounced lag in the production of the compounds and the attendant inefficient utilization of the equipment. Accordingly, it is desirable to produce a vegetative inoculum in a nutrient broth culture by inoculating this broth culture with an aliquot from a soil, liquid $N_2$ agar plug, or a slant culture. When a young, active vegetative inoculum has thus been secured, it is transferred aseptically to large vessels or tanks. The medium in which the vegetative inoculum is produced can be the same as, or different from, that utilized for the production of the compounds, so long as a good growth of th emicroorganism is obtained.

A variety of procedures can be employed in the isolation and purification of the compounds produced by the subject invention from fermentation beers, for example, solvent extraction, partition chromatography, silica gel chromatography, liquid-liquid distribution in a Craig apparatus, adsorption on resins, and crystallization from solvents.

In a preferred recovery process the compounds produced by the subject process invention are recovered from the culture medium by separation of the mycelia and undissolved solids by conventional means, such as by filtration or centrifugation.

The antibiotics are then recovered from the filtered or centrifuged broth by absorption on a resin column. Non-ionic (preferred) as well as cationic exchange resins can be used. Both the carboxylic acid and sulfonic acid types can be used. Suitable non-ionic resins include resins comprising a non-ionic macro porous copolymer of styrene crosslinked with divinylbenzene. Non-ionic resins of this type are marketed under the trade names Amberlite XAD-2 and XAD-4, disclosed in U.S. Pat. No. 3,515,717. Suitable carboxylic acid resins include the polyacrylic acid resins obtained by the copolymerization of acrylic acid and divinylbenzene by the procedure given on page 87 of Kunin, Ion Exchange Resins, 2nd Ed. (1958), John Wiley and Sons, Inc. Carboxylic acid cation exchange resins of this type are marketed under the trade names Amberlite IRC-50 and Zeokarb 226. Suitable sulfonic acid resins include sulfonated polystyrene resins crosslinked with divinylbenzene obtained by the procedure given on page 84 of Kunin, supra. Sulfonated cation exchange resins of this type are marketed under the trade names Dowex-50, Amberlite IR-120, Nalcite HCR, Chempro C-20, Permutit Q, and Zeokarb 225.

In the preferred process, using the non-ionic resin, the filtrate from the filtered fermentation beer is passed over the resin. The spent is collected. The column is then washed with water and the aqueous wash is collected. This spent and aqueous wash contain Antibiotic U-50,147. This antibiotic is recovered from these materials by chromatography over a carboxylic acid cation exchange resin or a sulfonic acid type resin as described above.

The material is passed over the cation exchange resin. The column is eluted with a basic solution, for example 0.25 N aqueous ammonium hydroxide (preferred), and other bases like 0.25 N aqueous sodium hydroxide, potassium hydroxide, and pyridinium acetate buffers prepared by mixing pyridine and acetic acid. Antibacterially-active fractions are collected. The active fractions are purified by use of a strongly basic anion exchange resin to remove impurities. Suitable anion exchange resins for this purpose are obtained by chlormethylating by the procedure given on pages 88 and 97 of Kunin,, supra, polystyrene crosslinked, if desired, with divinylbenzene prepared by the procedure given on page 84 of Kunin, supra, and quaternizing with trimethylamine, or dimethylthanolamine by the procedure given on page 97 of Kunin, supra. Anion exchange resins of this type are marketed under the trade names Dowex-1, Dowex-2, Dowex-3, Dowex-2K, Amberlite IRA-400, Amberlite JR-45, Duolite A-102, and Ionac A-300. Dowex-1(OH) is the preferred resin. Antibacterially-active fractions from the anion exchange resin are concentrated to dryness to give an essentially pure preparation of Antibiotic U-50,147.

Antibiotic U-51,738 is recovered from the fermentation beers of the subject invention process by first filtering the beer and then passing the filtrate over a non-ionic resin as described above. Antibiotic U-50,147 is not adsorbed onto the non-ionic resin, but, rather, passes through or is washed off the resin by water. On the other hand, antibiotic U-51,738 is adsorbed on the non-ionic resin and is removed by elution with a lower-alkanol-water solution. Preferably, methanol-water (90:10) is used to elute antibiotic U-51,738 from the non-ionic resin. Fractions containing antibiotic U-51,738, as determined by antibacterial testing hereinafter described, are combined and concentrated in vacuo. Insoluble crystalline material is separated during the concentration to give an essentially pure crystalline preparation of antibiotic U-51,738. This material is then recrystallized from a lower alcohol (ethanol is preferred) and water, to give an essentially pure crystalline preparation of antibiotic U-51,738.

Hereinafter are described non-limiting examples of the process of the subject invention. All percentages are by weight and all solvent mixture proportions are by volume unless otherwise noted.

EXAMPLE 1

Part A. Fermentation

A soil stock of *Streptomyces lemensis*, NRRL 8170, is used to inoculate a series of 500-ml Erlenmeyer flasks, each containing 100 ml of sterile seed medium consisting of the following ingredients:

| | |
|---|---|
| Glucose monohydrate | 10 g/liter |
| Bacto peptone (Difco) | 10 g/liter |
| Bacto Yeast Extract (Difco) | 2.5 g/liter |
| Deionized Water | Balance |

The seed inoculum is grown for 96 hours at 28° C. on a Gump rotary shaker operating at 250 rpm and having a 2½ inch stroke.

Seed inoculum (5%) prepared as described above, is used to inoculate a series of 500 ml Erlenmeyer fermentation flasks containing 100 ml of sterile fermentation medium consisting of the following ingredients:

| | |
|---|---|
| Cerelose | 14 g/liter |
| Starch (Buffalo)* | 12.5 g/liter |
| Cottonseed meal** | 40 g/liter |

-continued

| | |
|---|---|
| Tap water q.s. | 1 liter |

*CPC International, Englewood Cliffs, N.J.
**Southern Cotton Oil Division, Hunt Foods and Industries, Newport, Arkansas.

The pH of the fermentation medium is adjusted to 7.2 with an aqueous solution of sodium hydroxide before sterilization. The inoculated fermentation flasks are incubated at 28° C. on a rotary shaker operating at 250 rpm. The fermentation is monitored by assaying samples with the microorganisms *Bacillus subtilis* and *Penicillium oxalicium* to give the total assay for antibiotics U-50,147 and U-51,738. A representative 5-day fermentation has the following titers of antibiotics in the fermentation broth:

| | Assay in BU/ml | |
|---|---|---|
| Day | *B. subtilis* | *P. oxalicum* |
| 2 | 2.0 | 1.6 |
| 3 | 7.0 | 2.5 |
| 4 | 10.0 | 4.0 |
| 5 | 10.0 | 3.2 |

The assay is a disc-plate biounit assay on standard culture medium. The *B. subtilis* plates are prepared with Streptomycin Assay Agar with Yeast Extract (Antibiotic Medium #5, BBL, Cockeysville, Md.), and the *P. oxalcium* plates are prepared with Sabouraud Dextrose Agar (Difco Laboratories, Detroit, Michigan). The *B. subtilis* assay plates are incubated at 32° C. for 18 hours and the *P. oxalicum* assay plates are incubated at 28° C. for 18 hours.

A biounit (BU) is defined as the concentration of the antibiotic which gives a 20 mm zone of inhibition under the above assay condition. Thus, if for example a fermentation beer, or other solution containing the antibiotic, needs to be diluted 1/100 to give a 20 mm zone of inhibition, the potency of such beer or solution is 100 BU per ml.

Part B. Recovery (1) Filtration

Fermentation broth, as described above, ca. 10 liters, is filtered with the aid of diatomaceous earth. The filtrate is then subjected to chromatography over Amberlite XAD-4 as disclosed below.

(2) Chromatography Over Amberlite XAD-4

The column is prepared from 750 ml of Amberlite XAD-4 resin packed in water. Filtrate, obtained as described above, ca. 7.5 liters, is passed over the column at a rate of 30 ml/min. The spent filtrate is collected as one fraction (SPENT). The column is then washed with 2 liters of water at a rate of 30 ml/min. The aqueous wash is also collected as one fraction (AQUEOUS). The column is then eluted with 90% aqueous methanol. Fractions of 20 ml are collected. Results follow:

| | Zone Size (mm) | | |
|---|---|---|---|
| | *B. subtilis* | *P. vulgaris* | *P. oxalicum* |
| Starting Material (Filtrate) | 31 | 17 | 20 |
| Spent | 27 | 0 | traces |
| Aqueous | 25 | 0 | 0 |
| 90% Methanolic Eluates Fraction No. | | | |
| 5 | 22 | 0 | 0 |
| 10 | 20 | 0 | 0 |
| 15 | 20.5 | 0 | 0 |

-continued

| | Zone Size (mm) | | |
|---|---|---|---|
| | B. subtilis | P. vulgaris | P. oxalicum |
| 20 | 22 | 0 | 0 |
| 25 | 24 | 0 | 0 |
| 30 | 35 | 26 | 42 |
| 35 | 33 | 25 | 41 |
| 40 | 32 | 23 | 40 |
| 45 | 31 | 21 | 34 |
| 50 | 29 | 17 | 21 |
| 55 | 27.5 | traces | 16 |
| 60 | 26 | 0 | traces |
| 65 | 25 | 0 | traces |
| 70 | 24 | 0 | 0 |
| 75 | 23.5 | 0 | 0 |
| 80 | 24 | 0 | 0 |
| 85 | 23 | 0 | 0 |
| 90 | 23 | 0 | 0 |
| 95 | 22.5 | 0 | 0 |
| 100 | 22 | 0 | 0 |

Thin layer chromatography (tlc) using Eastman Cellulose Chromagram (13255) as support and a solvent consisting of 96% H₂O and 4% butanol is used to analyze or monitor the recovery operation. The presence of the desired antibiotics are shown by bioautography using the microorganisms P. oxalicum, K. pneumoniae, and S. lutea. This tlc shows that the spent filtrate and the aqueous wash contains antibiotic U-50,147. These two fractions are combined and labeled ADA-71A. Methanolic fractions 30–60 from the Amberlite XAD-4 column are shown by tlc to contain antibiotic U-51,738.

Preparations similar to ADA-71A are prepared from additional fermentation broth to give ca. 36 liters of material containing antibiotic U-50,147. The isolation of U-50,147 from this material is accomplished by chromatography over Amberlite IRC 50 (H⁺), described below.

(3) Chromatography Over Amberlite IRC-50 (H⁺)

The column is prepared from 1.5 liter of Amberlite IRC-50 in the hydrogen form. The starting material, 36 liters of the combined filtrates-wash, is adjusted to pH 3.0 with aqueous sulfuric acid. Insoluble material is separated by filtration. The clear filtrate is adjusted to pH 8.5 with aqueous sodium hydroxide and is passed over the column. The spent is collected as one fraction (SPENT). The column is washed with 12 liters of water. The aqueous wash is collected as one fraction (AQUEOUS). The column is washed with 6 liters of 0.25 N aqueous ammonium hydroxide collected as one fraction (0.25 N AMMONIA). The column is eluted with 1 N aqueous ammonium hydroxide. Fractions of 20 ml are collected. Results follow:

| | Zone Size (mm) | | | |
|---|---|---|---|---|
| | B. subtilis | K. pneumoniae | P. vulgaris | P. oxalicum |
| Spent | 0 | 0 | — | — |
| Aqueous | 0 | 0 | — | — |
| 0.25 N Ammonia | 0 | 0 | — | — |
| 1 N Ammonia Fraction No. | | | | |
| 10 | 0 | 0 | — | — |
| 20 | 0 | 0 | — | — |
| . | . | . | . | . |
| 230 | 0 | 0 | — | — |
| 240 | 21 | traces | — | — |
| 250 | 31 | 24 | — | — |
| 260 | 32 | 26 | — | — |
| 270 | 36 | 28.5 | — | — |
| 280 | 37 | 31 | — | — |
| 290 | 39 | 33 | — | — |
| 300 | 40 | 33 | — | — |
| 310 | 43.5 | 39 | 26 | 32 |
| 320 | 43 | 37.5 | 25.5 | 31 |
| 330 | 42 | 38 | 26 | 31 |
| 340 | 42.5 | 36.5 | 25 | 30 |
| 350 | 37 | 23 | 20 | 23 |
| 360 | 19 | 17.5 | 0 | 0 |
| 370 | traces | 0 | 0 | 0 |
| 390 | traces | 0 | 0 | 0 |
| 400 | 0 | 0 | 0 | 0 |
| . | . | . | . | . |
| 570 | 0 | 0 | 0 | 0 |

Fractions 250–279 are combined and concentrated to dryness in vacuo to give Preparation ADA-116.1, 890 mg.

Fractions 280–350 are treated similarly to give Preparation ADA-116.2, 6.28 g.

Preparations ADA-116.1 and ADA-116.2 contain antibiotic U-50,147 only (by tlc). Testing of preparation ADA-116.1 and ADA-116.2 shows the following:

| | Zone Size (mm) | |
|---|---|---|
| | ADA-116.1* | ADA-116.2* |
| P. oxalicum | 30 | 32 |
| P. vulgaris | 24 | 26 |
| K. pneumoniae | 36 | 39 |
| B. subtilis | 39 | 41 |

*Solutions of 10 mg/ml in water are tested.

Preparations ADA-116.1 and ADA-116.2 are combined and purified by Dowex-1 (OH⁻) chromatography as described below.

(4) Chromatography Over Dowex-1 (OH⁻)

The column is prepared from 400 ml of Dowex-1 (Cl⁻) (Dow Chemical Co., Midland, Michigan).

Six liters of 2 N aqueous sodium hydroxide is passed over the column at a rate of 10 ml/min. The column is then washed with water until the pH of the effluent is ca. 8.0.

Preparations ADA-116.1 and ADA-116.2 are combined (ca. 7.1 g) dissolved in 25 ml of water and passed over the column at a rate of 4 ml/min. The column is eluted with water. Fractions of 20 ml are collected. Testing shows the following:

| Fraction No. | Zone Size (mm) | |
|---|---|---|
| | B. subtilis | K. pheumoniae |
| 3 | 0 | 0 |
| 6 | 0 | 0 |
| 9 | 27 | 20 |
| 12 | 25 | 18 |
| 15 | 18.5 | traces |
| 18 | 16 | 0 |
| 21 | traces | 0 |
| 24 | 17 | 0 |
| 27 | 18 | traces |
| 30 | 21 | traces |
| 33 | 22 | 15 |
| 36 | 22 | 15 |
| 39 | 23 | 16 |
| 42 | 24 | 16 |
| 45 | 25 | 17 |
| 48 | 24 | 17 |
| 51 | 25 | 18 |
| 54 | 26 | 19 |
| 57 | 27 | 20 |
| 60 | 30 | 23 |
| 62 | 30 | 22 |
| 66 | 30 | 22 |
| 69 | 30 | 22 |
| — | — | — |
| 60 | 24 | 20.5 |
| 65 | 25.5 | 22 |
| 70 | 25.5 | 21.5 |
| 75 | 26 | 22.5 |
| 80 | 27 | 24 |
| 85 | 28 | 24.5 |
| 90 | 28.5 | 25.5 |
| 95 | 30 | 27 |
| 100 | 31 | 28.5 |
| 110 | 32 | 27.5 |
| 120 | 32 | 29 |
| 130 | 33 | 30 |
| 140 | 33.5 | 31 |
| 150 | 34 | 31.5 |
| 160 | 34.5 | 31 |
| 170 | 35 | 32 |
| 180 | 35 | 32 |
| 190 | 35 | 32 |
| 200 | 35 | 32 |
| 210 | 35 | 30 |
| 220 | 34 | 30 |
| 230 | 33 | 30 |
| 240 | 32 | 29 |
| 250 | 31.5 | 29.5 |
| 260 | 31 | 29.5 |
| 270 | 31 | 29 |
| 280 | 30 | 28.5 |
| 290 | 30 | 27.5 |
| 300 | 29 | 27.5 |
| 310 | 28.5 | 26 |
| 320 | 28 | 26 |
| 330 | 27 | 25 |
| 340 | 26 | 24 |
| 350 | 26.5 | 23 |
| 360 | 26 | 22 |
| 370 | 26 | 22 |
| 380 | 26 | 22 |
| 390 | 25.5 | 22 |
| 400 | 26 | 22.5 |
| 410 | 24 | 21 |
| 420 | 24 | 21 |
| 430 | 23 | 20.5 |
| 440 | 23.5 | 20 |
| 450 | 23 | 20 |
| 460 | 23 | 20 |
| 470 | 23 | 19 |
| 480 | 23 | 19 |
| 490 | 23 | 20 |
| 500 | 22.5 | 20 |
| 510 | 22.5 | 20 |
| 520 | 22 | 19 |
| 530 | 22 | 19 |
| 540 | 21.5 | 18.5 |
| 550 | 21 | 18 |

The following pools are made. Each pool is concentrated to dryness to give the following preparations.

| Pool I | Fractions 8-18 | ADA-123.1, | 360 mg |
|---|---|---|---|
| Pool II | Fractions 30-50 | ADA-123.2, | 570 mg |
| Pool III | Fractions 51-90 | ADA-123.3, | 333 mg |
| Pool IV | Fractions 91-200 | ADA-123.4, } | See |
| Pool V | Fractions 201-300 | ADA-123.5, | Below |
| Pool VI | Fractions 301-500 | ADA-123.6, | 330 mg |

Preparations ADA-123.4 and ADA-123.5 are combined and kept as ADA-123.4A, 1.64 G.

Preparation ADA-123.4A contains essentially pure (tlc and paper chromatography) antibiotic U-50,147.

Antibiotic U-50,147 has the following characteristics:

a. Infrared

The IR bands in Nujol and KBr are presented in Tables A (Nujol) and B (KBr) as follows:

Table A

Band Tabulation of the Infrared Spectrum of Antibiotic U-50,147 (Nujol Mull)

| Band Frequency (Wave Numbers) | Intensity |
|---|---|
| 3350 | S |
| 3290 | S |
| 2960 | N, S |
| 2920 | N, S |
| 2850 | N, S |
| 2730 | M |
| 1640 | N, sh |
| 1588 | S |
| 1462 | N, S |
| 1378 | N, S |
| 1368 | S, sh |
| 1342 | M |
| 1245 | M |
| 1152 | S |
| 1078 | S |
| 1040 | S |
| 1008 | S |
| 940 | M |
| 892 | M |
| 860 | M |
| 808 | M |
| 790 | M |
| 722 | N, M |
| 670 | M |

Key:
S=Strong,
M=Medium,
W=Weak,
sh=Shoulder,
N=Nujol

Table B

Band Tabulation of the Infrared Spectrum of Antibiotic U-50,147 (KBr Pellet)

| Band Frequency (Wave Numbers) | Intensity |
|---|---|
| 3410 | S |
| 3370 | S |
| 3290 | S, sh |
| 2920 | M |
| 2880 | M |
| 2700 | M, sh |
| 1630 | M, sh |
| 1590 | M |
| 1458 | M |
| 1385 | M |
| 1339 | M |
| 1242 | M |
| 1152 | S |
| 1075 | S |
| 1038 | S |
| 1005 | S |
| 938 | M |
| 890 | M |
| 805 | M |
| 790 | M |
| 730 | M |
| 700 | M |
| 668 | M |

Key:
S=Strong,
M=Medium,
W=Weak,
sh=Shoulder b. UV Absorption Spectrum

Antibiotic U-50,147 does not show any UV maxima between 220-400 mn.

c. Titration Data

Potentiometric titration in water using aqueous hydrochloric acid shows an equivalent weight of 192.

d. Elemental Analyses

Calculated for $C_{19}H_{35}H_3O_{13}$: C, 44.44; H, 6.82; N, 8.18; O, 40.55. Found: C, 41.78; H, 6.92; N, 8.64.

e. Molecular Weight

The molecular weight determined by field desorption mass spectrometry is found to be 513. Field desorption mass spectra are obtained on the CH5DF mass spectrometer.

f. Optical Rotation $[\alpha]_D^{25}$ + 13° (C, 0.95, water)

g. Solubilities

Antibiotic U-50,147 (both the free base and the salts) is soluble in water and lower alcohols (methanol, ethanol). The antibiotic is insoluble in higher alcohols, acetone, ethyl acetate, chlorinated hydrocarbon and saturated hydrocarbon solvents.

EXAMPLE 2

Isolation of Antibiotic U-51,738

The methanolic fractions obtained in Example 1, Part B (2) from the Amberlite XAD-4 resin are combined and the solution is concentrated in vacuo. Insoluble crystalline material of antibiotic U-51,738 is separated during the concentration; yield 1.8 grams. 700 mg of this material is recrystallized from 60 ml of ethanol and 10 ml of water to give an essentially pure crystalline preparation of antibiotic U-51,738. The crystalline material is in the form of colorless needles. Antibiotic U-51,738 is a known antibiotic, L-dihydrophenylalanine, having the following structural formula:

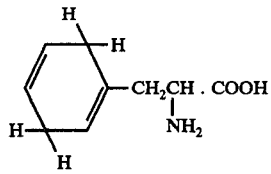

This compound has the following reported characteristics: (See J. Org. Chem. 33, 1779 [1968]).

Anal. Calcd. for $C_9H_{13}NO_2$: C, 64.7; H, 7.84; N, 8.38. Found: C,65.0; H, 7.86; N, 8.53.

IR bands: KBr$^v$max 3030-2850, 2620, 1590-1560, 1480, 1390, 1220, 1135, 965, 895, 855 cm$^{-1}$.

We claim:

1. A process for recovering antibiotic U-50,147 from a fermentation mixture f antibiotics U-50,147 and U-51,738 which comprises:
   (a) filtering a fermentation beer containing antibiotic U-50,147 and antibiotic U-51,738 to obtain a clear beer;
   (2) passing said clear beer over a non-ionic resin and collecting a spent filtrate;
   (3) washing said resin with water and collecting an aqueous wash;
   (4) combining said spent and aqueous wash and chromatographing them over a cationic exchange resin and eluting said resin with a basic solution to obtain fractions containing antibiotic U-50,147;
   (5) passing said fractions containing antibiotic U-50,147 over a strongly basic anion exchange resin and eluting said resin with water and collecting fractions; and
   (6) concentrating said fractions containing antibiotic U-50,147 to give an essentially pure preparation of antibiotic U-50,147.

2. A process, according to claim 1, wherein said nonionic resin is Amberlite XAD-4.

3. A process, according to claim 1, wherein said cation exchange resin is Amberlite IRC-50 (H$^+$).

4. A process, according to claim 1, wherein said cation exchange resin is eluted wit 0.25 N aqueous ammonium hydroxide.

5. A process, according to claim 1, wherein said anion exchange resin is Dowex-1 (OH$^-$).

6. A process for recovering antibiotic U-51,738 from a fermentation mixture of antibiotics U-51,738 and U-50,147 which comprises:
   (1) filtering a fermentation beer containing antibiotic U-51,738 and antibiotic U-50,147 to obtain a clear beer;
   (2) passing said clear beer over a non-ionic resin and eluting said resin with a lower-alkanol-water solution to obtain fractions containing antibiotic U-51,738; and
   (3) concentrating said fractions to give an essentially pure crystalline preparation of antibiotic U-51,738.

7. A process, according to claim 6, wherein said non-ionic resin is Amberlite XAD-4.

8. A process, according to claim 6, wherein said lower-alkanol-water solution is methanol-water (90:10).

* * * * *

UNITED STATES PATENT OFFICE
CERTIFICATE OF CORRECTION

Patent No. 4,091,201          Dated May 23, 1978

Inventor(s) Alexander D. Argoudelis and LeRoy E. Johnson

It is certified that error appears in the above-identified patent and that said Letters Patent are hereby corrected as shown below:

Column 1, line 6, for "4,019,548" read -- 4,029,548 --;
line 25, for "Grampositive" read -- Gram-positive --;
line 39, for "streptomyces" read -- Streptomyces --;
line 55, for "bichemical" read -- biochemical --;
line 63, for "68" read -- 69 --. Column 3, line 12, for "and D-xylose" read -- and on D-xylose --. Column 4, Table 2, under Chip No., line 3, for "73" read -- 78 --; under last column, line 12, for "Yello" read -- Yellow --. Column 5, line 52, for "andin" read -- and in --; line 55, for "preferably" read -- preferable --; line 56, for "themicroorganism" read -- the microorganism --. Column 8, line 12, for "oxalicium" read -- oxalicum --; line 28, for "oxalcium" read -- oxalicum --; line 35, for "condition" read -- conditions --. Column 10, line 25, under K. pneumoniae, for "36.5" read -- 37.5 --. Column 11, line 3, for "K. pheumoniae" read -- K. pneumoniae --; line 15, under B. subtilis, for "25" read -- 24 --. Column 12, line 7, for "1.64 G." read -- 1.64 g. --; line 25, Table A, under Intensity, for "N, sh" read -- M, sh --. Column 14, Claim 1, line 9, for "f" read -- of --; line 11, for "(a)" read -- (1) --. Column 14, Claim 4, line 34, for "wit" read -- with --.

Signed and Sealed this

Tenth Day of October 1978

[SEAL]

Attest:

RUTH C. MASON
Attesting Officer

DONALD W. BANNER
Commissioner of Patents and Trademarks